(12) United States Patent
Perbost et al.

(10) Patent No.: US 6,387,636 B1
(45) Date of Patent: May 14, 2002

(54) METHOD OF SHIELDING BIOSYNTHESIS REACTIONS FROM THE AMBIENT ENVIRONMENT ON AN ARRAY

(75) Inventors: Michel G. M. Perbost, Cupertino; Steven M. Lefkowitz, Millbrae, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/426,823

(22) Filed: Oct. 22, 1999

(51) Int. Cl.[7] .................... G01N 33/53; C07H 19/00; C07H 21/00; C07H 21/02
(52) U.S. Cl. ................ 435/7.1; 435/DIG. 49; 536/22.1; 536/23.1
(58) Field of Search .............. 435/7.1, DIG. 49; 536/22.1, 23.1

(56) References Cited

U.S. PATENT DOCUMENTS 5,085,991 A * 2/1992 Ogawa et al. .............. 435/108
6,004,763 A * 12/1999 Gengoux et al. ........... 435/7.24
6,043,330 A * 3/2000 Hacher et al. ................ 528/10

FOREIGN PATENT DOCUMENTS

WO    WO 95/25116    * 9/1995

OTHER PUBLICATIONS

J. Biotechnol. (1990), 15(4), 323–38, Clapes et al (only the abstract is attached).*

* cited by examiner

*Primary Examiner*—Bennett Celsa
*Assistant Examiner*—Thomas Prasthofer

(57) ABSTRACT

A method of fabricating an array of biopolymers provides a shield for biochemical reactions and biochemical reactants and is particularly useful for those reactions and reactants that are susceptible to reaction with a component of the ambient environment during the fabrication of the array. The method is applicable to the conventional fabrication and synthesis methods used to fabricate a biopolymer array, such as in situ synthesis of biopolymers on an array and the attachment of pre-synthesized biopolymers on to an array. The method comprises applying a non-miscible fluid (NMF) to the array surface where the biopolymers are being synthesized or attached. The NMF is inert and insoluble with the biochemical reactants and other ancillary materials in solution used in conventional synthesis or attachment of biopolymers. The NMF provides a shield between the ambient atmosphere and the biopolymer synthesis materials or the deprotected pre-synthesized biopolymer at the surface of the array during the synthesis or attachment processes. The NMF may be applied as droplets over each feature location on the surface or may be applied by flooding the surface of the array to fully cover the features. Biomonomer or biopolymer solutions are deposited into or through the NMF to the feature locations on the surface of the array where the synthesis or attachment reactions are to take place using conventional deposition equipment to eject the solutions into the NMF. The NMF provides a shield for activated biomonomers that are susceptible to reaction with a component in the ambient environment, such as moisture in the air. Moreover, the NMF provides a shield for pre-synthesized biopolymers that are susceptible to evaporation when deprotected for attachment to the array surface. The method provides a means by which the potential reactivity of the activated biomonomer or deprotected biopolymer with an ambient atmosphere component can be kept low. As a result, biopolymer arrays can be more accurately fabricated.

28 Claims, 5 Drawing Sheets

METHOD OF SHIELDING BIOSYNTHESIS REACTIONS FROM THE AMBIENT ENVIRONMENT ON AN ARRAY

TECHNICAL FIELD

This invention relates to arrays of biopolymers used in diagnostics, screening, gene expression analysis, and other applications. In particular, the invention relates to a method of fabricating biopolymer arrays, such as DNA arrays.

BACKGROUND ART

Polynucleotide arrays, such as DNA or RNA arrays, are known and are used, for example, as diagnostic or screening tools. Such arrays comprise a plurality of different polynucleotide probes arranged in a predetermined configuration on a substrate. The polynucleotides of the plurality differ by having a different nucleotide sequence. Different polynucleotide probes are located at different regions (also known as features or spots) on the substrate, wherein in each region, multiple copies of the same polynucleotide are usually present.

The array is exposed to a sample of biological material to be evaluated, also known as the "target". Upon exposure to the target sample, the array will exhibit a binding pattern, wherein complementary target polynucleotides will hybridize or bind to the array polynucleotide probes during an assay. This binding pattern can be observed, for example, by labeling all polynucleotide targets (for example, DNA) in the sample with a suitable label (such as a fluorescent compound), and accurately observing the fluorescence pattern on the array. Assuming that the different sequence polynucleotide probes were correctly deposited in accordance with the predetermined configuration, then the observed binding pattern will be indicative of the presence and/or concentration of one or more polynucleotide components of the target sample.

Biopolymer arrays can be fabricated using either methods of deposition of intact biopolymer species or using in situ synthesis methods. The deposition methods basically involve depositing intact biopolymers at predetermined locations on a substrate that are suitably activated such that the intact biopolymers can link thereto. The intact species of biopolymers, each having different monomer sequences, may be deposited at different regions of the substrate to yield the completed array having a predetermined configuration. Typical procedures known in the art for deposition of intact polynucleotide species, particularly DNA such as whole oligomers or cDNA, are to load a small volume of DNA in solution in one or more drop dispensers such as the tip of a pin or in an open capillary and, touch the pin or capillary to the surface of the substrate. Such a procedure is described in U.S. Pat. No. 5,807,522. When the fluid touches the substrate surface, some of the fluid is transferred from the pin or capillary to the substrate location. The pin or capillary must be washed prior to picking up the next type of DNA for spotting onto the array. This process is repeated for the plurality of different polynucleotides and, eventually, the desired array having a predetermined configuration is formed. Alternatively, the DNA can be loaded into a drop dispenser in the form of an inkjet head and fired onto the substrate. Such a technique has been described, for example, in PCT publications WO 95/25116 and WO 98/41531, and elsewhere.

The in situ synthesis methods include those described in U.S. Pat. No. 5,449,754 for synthesizing peptide arrays, as well as WO 98/41531 and the references cited therein for synthesizing polynucleotides (specifically, DNA) using phosphoramidite or other chemistry. Such in situ synthesis methods can be basically regarded as iterative steps of depositing droplets of: (a) a protected monomer onto predetermined locations on a substrate to link with either a suitably activated substrate surface (or with a previously deposited deprotected monomer); (b) deprotecting the deposited monomer so that it can now react with a subsequently deposited protected monomer; and (c) depositing another protected monomer for linking. Different monomers may be deposited at different regions on the substrate during any one cycle so that the different regions of the completed array will carry the plurality of different biopolymer sequences as desired in the completed array. In situ synthesis methods may require one or more intermediate further steps in each iteration, such as oxidation and washing steps, as are well known in the art.

In order for an assay to yield accurate results, it is important that the different biopolymer features actually be present on the array, that they are put down accurately in the desired or predetermined pattern, that the biopolymers are of the correct size, and that each different feature be uniformly populated with the respective biopolymer.

In polynucleotide arrays, the conventional in situ synthesis methods use phosphoramidite nucleoside monomers. In order for the phosphoramidite group to link to a hydroxyl of a previously deposited deprotected polynucleotide monomer, it must first be activated usually by using a weak acid, such as tetrazole. However, an activated phosphoramidite is highly reactive with moisture in the air. Therefore, unless some precaution is taken, the activated phosphoramidite can be used up before the desired reaction is complete. As a result there is a reduction in the deposited phosphoramidite monomer available for forming the complete polynucleotide. This problem is present even when the synthesis is performed in a nitrogen chamber.

Further, the size (volume) of the synthesis droplet on the substrate surface could be very small, such as a few pico- or nano-liters, such that the ratio of surface to volume is very high. A high surface to volume ratio favors the diffusion of moisture into the droplets. Initially, the moisture from the air tends to be adsorbed at the surface of the synthesis droplet. Therefore, the phosphoramidite concentration at the surface of the droplet will tend to be lowest. Consequently, the concentration of a completed probe polynucleotide at a feature on the array tends to decrease from the center of a feature toward its perimeter. Variations in completed probe concentration within a feature result in a decrease in the concentration of target sample that consequently hybridizes to the respective polynucleotide probe. Therefore, the total signal that should be available from the hybridized target is diminished at the particular feature location during optical evaluation of the array. Further, it should be noted that the water vapor concentration in the ambient atmosphere might vary. Therefore, the signal from the hybridized target may also vary from array to array, leading to inconsistency in absolute signal generated from different arrays of a batch when the same concentration of a target is encountered.

The foregoing problems exist particularly where the phosphoramidite is mixed with the activator and the mixture is deposited as a droplet on the substrate, and even where the activator is deposited onto a previously deposited droplet containing the phosphoramidite, both as such are described in PCT publication WO 98-41531. In either case, ambient moisture presents a problem. Furthermore, when one droplet is deposited on the other, there is no guarantee of efficient mixing such that the activated phosphoramidite will be evenly present at the substrate surface.

Thus, it would be advantageous to have a means of fabricating biopolymer arrays that lessens the likelihood of deleterious environmental influences on the accuracy of the fabrication. In particular, it would be desirable, in the fabrication of arrays of biopolymers using biomonomers with a linking group that must be activated (such as a phosphoramidite), to provide a means by which the potential reactivity of the activated biomonomer with an ambient atmosphere component (such as water vapor in air) can be kept low.

SUMMARY OF THE INVENTION

The present invention provides a method of fabricating an array of biopolymers on a substrate. The method is useful for shielding biosynthesis reactions and the bio-reactants from the ambient environment. Moreover, the method is useful for shielding pre-synthesized biopolymers during their attachment to an array substrate. In particular, the method is useful for shielding biosynthesis reactions and reaction components during the synthesis process or linking process that are susceptible to reaction with a component of the ambient environment, for example moisture in the air. The method of the invention is applicable to the conventional fabrication and synthesis methods used to fabricate a biopolymer array.

In one aspect of the method, the array is fabricated using conventional in situ techniques. A first biomonomer is deposited onto a substrate for linking to a surface of the substrate in an array pattern of features by conventional methods. The linked biomonomer is deprotected using conventional methods, such that the biomonomer can react with subsequent biomonomers that are added to grow the biopolymer chain. The subsequent biomonomer may require activation before attachment to the growing chain. The biomonomer and a suitable activation reagent are deposited on the array for attachment to the deprotected surface-linked biomonomer. The biomonomers are deposited using conventional deposition equipment, such as computer controlled inkjet systems or piezoelectric deposition systems that are well known in the art. The method of the invention comprises applying a non-miscible fluid (NMF) to the array surface where the biopolymers are being synthesized. The NMF is inert and insoluble with the ancillary materials, reagents and biomonomers used in the synthesis of the biopolymers. In accordance with the invention, the NMF provides a shield between the ambient atmosphere and the biopolymer synthesis materials at the surface of the array during the synthesis process. The shield will delay the diffusion of ambient conditions into the synthesis areas. The subsequent biomonomers are deposited on the array until a desired biopolymer sequence is synthesized at each feature. The NMF may be applied as droplets over each feature location or may be applied by flooding the surface of the array to fully cover the features and the growing biopolymer sequences.

The deposition system used to deposit biomonomers in solution on the array has a head with multiple pulsejets, each of which can dispense fluid droplets onto the substrate. Each such jet includes a chamber with an orifice, and an ejector which, when activated, causes a droplet to be ejected from the orifice. According to the invention, the inkjets of the deposition system are either immersed into the NMF to fire droplets of the activated biomonomer through the NMF to the biopolymer synthesis sites, or not immersed, but positioned above the level of the NMF to fire the activated biomonomer droplets into the NMF to the biopolymer synthesis sites on the array. In the preferred embodiment, the density of the NMF is different from the anhydrous solution of solvent, biomonomers and activation reagents.

In a preferred embodiment, the method of fabricating further comprise the step of deactivating any unreacted activation reagent after the activated biomonomer is added to the linked biomonomer on the array. An ancillary material that stops the action of the activation reagent (i.e., deactivation reagent) may be added to the array, preferably by flooding the array surface. The deactivation reagent solution has a density that is different from the density of the NMF to facilitate the deactivation reagent reaching the unreacted activation reagent at biopolymer synthesis sites through the NMF shield. The preferred embodiment further comprises the step of removing all the ancillary materials and unreacted biomonomer from the array surface so that the growing biopolymer chain can undergo other chemistry.

The foregoing steps are repeated, with a biomonomer deposited and linked to a previously deposited and linked biomonomer on the substrate. The growing biopolymer chain acts as a substrate bound moiety for each cycle, until all of the biomonomers have been added to the biopolymer array. In the fabrication of a typical array with multiple features, all of the foregoing steps are repeated at each of multiple different regions on the same substrate, where it is desired to form the biopolymer features.

The biopolymers arrays that may be fabricated according to the invention include DNA, RNA, proteins, etc. arrays, for example. Where the array is a polynucleotide or oligonucleotide array (for example, DNA), the biomonomer is a nucleoside monomeric unit. The activated biomonomer is typically a phosphoramidite according to conventional oligonucleotide synthesis. Activated phosphoramidites are well known to be highly reactive with moisture. Without the method of the invention, an activated phosphoramidite will react with water vapor in ambient atmosphere and be depleted before a sufficient amount of the phosphoramidite has reacted with the growing polynucleotide chains of the array, even in a nitrogen chamber.

In another aspect of the invention, a method of fabricating biopolymer arrays from pre-synthesized biopolymers is provided. The pre-synthesized biopolymer is deprotected before it is linked to the array surface. The deprotected pre-synthesized biopolymer is soluble in aqueous buffer solution. The droplets of the deprotected pre- synthesized biopolymer solution that are deposited for linking to an array substrate are very small and have the tendency to evaporate quickly in the ambient environment. The method of fabricating according to this embodiment comprises enclosing the droplets of the deprotected pre-synthesized biopolymer solution in the NMF for deposition. The NMF is inert, immiscible and insoluble in aqueous solution. Therefore, the NMF will surround the droplets and delay the diffusion of the aqueous solution out of the droplet such that the concentration of the deprotected pre-synthesized biopolymer will remain relatively constant while it links to the surface of the array substrate at each feature.

In still another aspect of the invention, a method of shielding biosynthesis reactions and biosynthesis reactants from the ambient environment is provided. The method of shielding comprises applying the NMF to one or more sites where the biosynthesis reactions take place. The NMF is inert and insoluble with respect to the biosynthesis reactions and the biosynthesis reactants. The NMF is applied to cover the biosynthesis site(s). The method of shielding further comprises depositing one or more of the sensitive biosynthesis reactants through the NMF on the biosynthesis site(s).

In still another aspect of the invention, a shield that protects sensitive biosynthesis reactions and biosynthesis reactants from the ambient environment is provided. The shield comprises a non-miscible fluid (NMF) applied to cover the biosynthesis reactions and reactants. The NMF is inert and insoluble with respect to the biosynthesis reactions and the biosynthesis reactants.

The present methods and apparatus provide any one or more of a number of useful benefits. For example, in the fabrication of arrays of biopolymers using biomonomers with a linking group that must be activated, the present invention provides a means by which the potential reactivity of the activated biomonomer with an ambient atmosphere component can be kept low. Further, in the fabrication of arrays of biopolymers using pre-synthesized biopolymers that are water-soluble when deprotected for linking to the surface of the substrate, the present invention provides a means by which the potential reactivity of the deprotected biopolymer in solution with an ambient atmosphere can be kept low.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which:

FIG. 6b illustrates a magnified view of one portion of the apparatus of FIG. 6a.

MODES FOR CARRYING OUT THE INVENTION

Definitions

Figure 1:
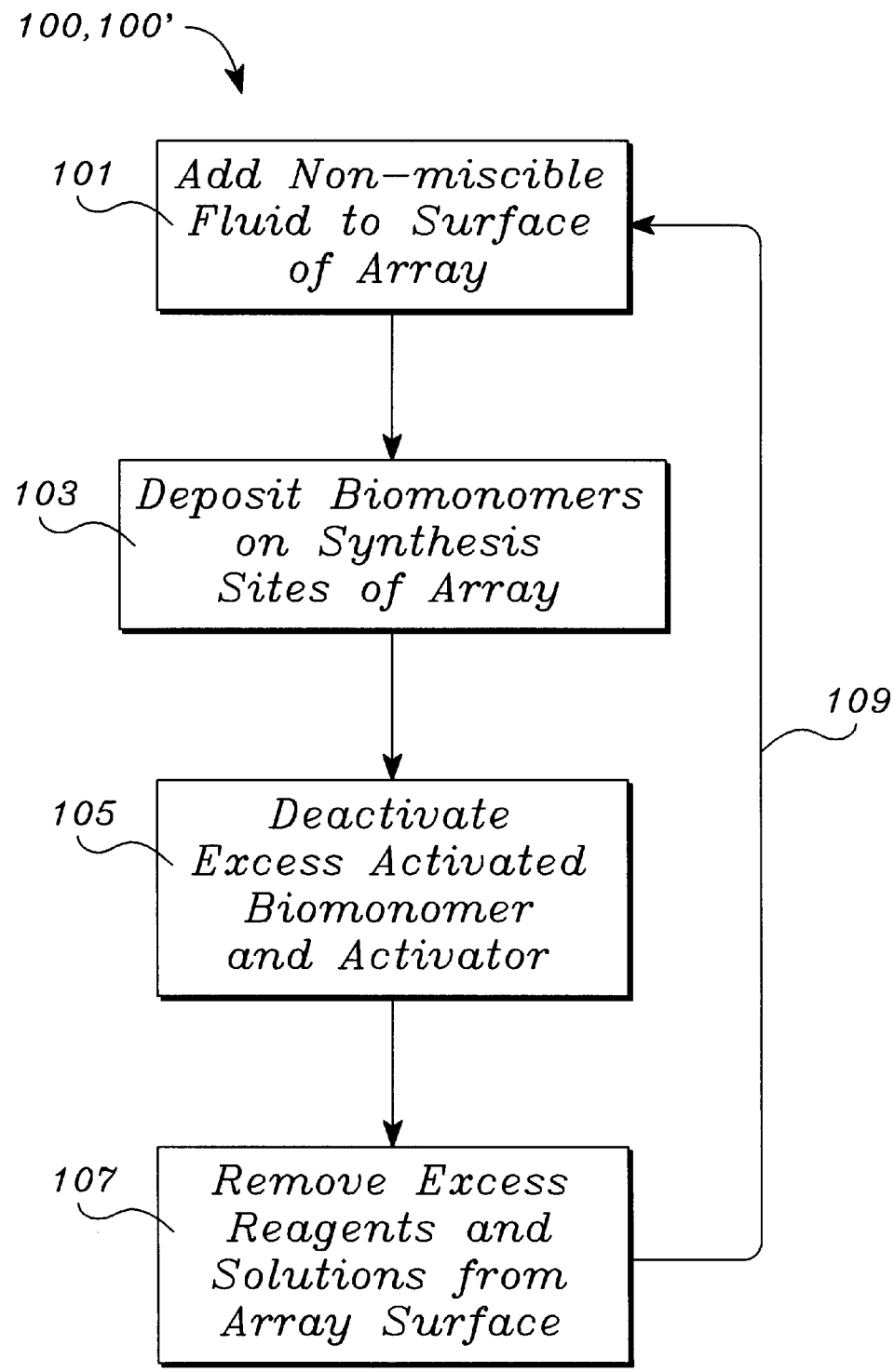
FIG. 1 illustrates a block diagram of the method of the present invention.

The following terms are intended to have the following general meanings as they are used herein:

Polynucleotide—a compound or composition that is a polymeric nucleotide or nucleic acid polymer. The polynucleotide may be a natural compound or a synthetic compound. In the context of an assay, the polynucleotides can have from about 20 to 5,000,000 or more nucleotides. The larger polynucleotides are generally found in the natural state. In an isolated state the polynucleotide can have about 30 to 50,000 or more nucleotides, usually about 100 to 20,000 nucleotides, more frequently 500 to 10,000 nucleotides. Thus, it is obvious that isolation of a polynucleotide from the natural state often results in fragmentation. The polynucleotides include nucleic acids, and fragments thereof, from any source in purified or unpurified form including DNA, double-stranded or single stranded (dsDNA and ssDNA), and RNA, including t-RNA, m-RNA, r-RNA, mitochondrial DNA and RNA, chloroplast DNA and RNA, DNA/RNA hybrids, or mixtures thereof, genes, chromosomes, plasmids, the genomes of biological materials such as microorganisms, e.g. bacteria, yeasts, viruses, viroids, molds, fingi, plants, animals, humans, and the like. The polynucleotide can be only a minor fraction of a complex mixture such as a biological sample. Also included are genes, such as hemoglobin gene for sickle-cell anemia, cystic fibrosis gene, oncogenes, cDNA, and the like.

The polynucleotide can be obtained from various biological materials by procedures well known in the art. The polynucleotide, where appropriate, may be cleaved to obtain a fragment that contains a target nucleotide sequence, for example, by shearing or by treatment with a restriction endonuclease or other site specific chemical cleavage method.

For purposes of this invention, the polynucleotide, or a cleaved fragment obtained from the polynucleotide, will usually be at least partially denatured or single stranded or treated to render it denatured or single stranded. Such treatments are well known in the art and include, for instance, heat or alkali treatment, or enzymatic digestion of one strand. For example, double stranded DNA (dsDNA) can be heated at 90–100° C. for a period of about 1 to 10 minutes to produce denatured material, while RNA produced via transcription from a dsDNA template is already single stranded.

Oligonucleotide—a polynucleotide, usually single stranded, usually a synthetic polynucleotide but may be a naturally occurring polynucleotide. The oligonucleotide(s) are usually comprised of a sequence of at least 5 nucleotides, usually, 10 to 100 nucleotides, more usually, 20 to 50 nucleotides, preferably, 10 to 30 nucleotides, more preferably, 20 to 30 nucleotides, and desirably about 25 nucleotides in length.

Various techniques can be employed for preparing an oligonucleotide. Such oligonucleotides can be obtained by biological synthesis or by chemical synthesis. For short sequences (up to about 100 nucleotides), chemical synthesis will frequently be more economical as compared to the biological synthesis. In addition to economy, chemical synthesis provides a convenient way of incorporating low molecular weight compounds and/or modified bases during specific synthesis steps. Furthermore, chemical synthesis is very flexible in the choice of length and region of target polynucleotides binding sequence. The oligonucleotide can be synthesized by standard methods such as those used in commercial automated nucleic acid synthesizers. Chemical synthesis of DNA on a suitably modified glass or resin can result in DNA covalently attached to the surface. This may offer advantages in washing and sample handling. For longer sequences, standard replication methods employed in molecular biology can be used, such as the use of M13 for single stranded DNA as described in J. Messing (1983) Methods Enzymol. 101:20–78.

Other methods of oligonucleotide synthesis include phosphotriester and phosphodiester methods (Narang, et al. (1979) *Meth. Enzymol.* 68:90) and synthesis on a support (Beaucage, et al. (1981) *Tetrahedron Letters* 22:1859–1862) as well as phosphoramidite techniques (Caruthers, M. H., et al., "Methods in Enzymology," Vol. 154, pp. 287–314 (1988) and others described in "Synthesis and Applications of DNA and RNA," S. A. Narang, editor, Academic Press, New York, 1987, and the references contained therein. The chemical synthesis via a photolithographic method of spatially addressable arrays of oligonucleotides bound to glass surfaces is described by A. C. Pease, et al., *Proc. Nat. Aca. Sci. USA* (1994) 91:5022–5026.

For the purposes of this invention, the terms "oligonucleotide" and "polynucleotide" are used interchangeably, unless otherwise noted.

Oligonucleotide or Polynucleotide Probe—an oligonucleotide employed to bind to a portion of a polynucleotide, such as another oligonucleotide or a target nucleotide sequence. The design and preparation of the oligonucleotide probes are generally dependent upon the sensitivity and specificity required, the sequence of the target polynucleotide and, in certain cases, the biological significance of certain portions of the target polynucleotide sequence.

Monomer—A member of the set of small molecules which can be joined together to form a polymer. The set of monomers includes but is not restricted to, for example, the set of common L-amino acids, the set of D-amino acids, the set of synthetic amino acids, the set of nucleotides and modified nucleotides, and the set of pentoses and hexoses. Other examples include a basic phosphodiesters, such as polyethers, and protein-nucleic acid (PNA) hybrids. As used herein, monomers refers to any member of a basis set for synthesis of a polymer. For example, dimers of the 20 naturally occurring L-amino acids form a basis set of 400 monomers for the synthesis of polypeptides. Different monomers may be used at successive steps in the synthesis of a polymer. Furthermore, each of the monomers may include protected members that are modified after synthesis. A monomer may also include modified monomers.

Phosphoramidite—For the purposes of the invention, the term "phosphoramidite(s)" includes phosphite(s) and H-phosphonate(s). Formula I covers phosphoramidites, phosphites and H-phosphonates:

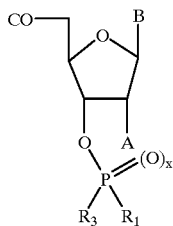

(I)

in which:

A represents H or an optionally protected hydroxyl group;

B is a purine or pyrimidine base whose exocyclic amine functional group is optionally protected;

C is a conventional protective group for the 5'-OH functional group (for the purposes of the definition herein the "C" does not represent carbon per se);

x=0 or 1 provided:
  a) when x=1:
  $R_3$ represents H and $R_4$ represents a negatively charged oxygen atom; or
  $R_3$ is an oxygen atom and $R_4$ represents either an oxygen atom or an oxygen atom carrying a protecting group; and
  b) when x=0:
  $R_3$ is an oxygen atom carrying a protecting group and $R_4$ is either a hydrogen or a di-substituted amine group.

When x is equal to 1, $R_3$ is an oxygen atom and $R_4$ is an oxygen atom, the synthesis method is in this case the so-called phosphodiester method; when $R_4$ is an oxygen atom carrying a protecting group, the synthesis method is in this case the so-called phosphotriester method.

When x is equal to 1, $R_3$ is a hydrogen atom and $R_4$ is a negatively charged oxygen atom, the synthesis method is known as the H-phosphonate method.

When x is equal to 0, $R_3$ is an oxygen atom carrying a protecting group and $R_4$ is either a halogen, the synthesis method is known as the phosphite method and, when $R_4$ is a leaving group of the di-substituted amine type, the synthesis method is known as the phosphoramidite method.

Phosphoramidites and nucleoside phosphoramidites are described in U.S. Pat. No. 5,902,878, U.S. Pat. No. 5,700,919, U.S. Pat. No. 4,415,732, PCT publication WO 98/41531 and the references cited therein, among others, all incorporated by reference. A "group" includes both substituted and unsubstituted forms.

Nucleotide—the monomeric unit of nucleic acid polymers, i.e., DNA and RNA, that comprises a nitrogenous heterocyclic base, which is a derivative of either a purine or pyrimidine, a pentose sugar, and a phosphate (or phosphoric acid) and includes modified nucleotides. When the phosphate is removed, the monomeric unit that remains is a "nucleoside". Thus a nucleotide is a 5'-phosphate of the corresponding nucleoside. When the nitrogenous base is removed from the nucleotide, the monomeric unit that remains is a "phosphodiester". For the purposes of the invention, "nucleotide" includes its corresponding nucleoside and phosphodiester, and "oligonucleotide" includes its corresponding oligonucleoside and oligophosphodiester, unless indicated otherwise.

Modified Nucleotide—a unit in a nucleic acid polymer that contains a modified base, sugar and/or phosphate group. The modified nucleotide can be produced by a chemical modification of a nucleotide either as part of the nucleic acid polymer or prior to the incorporation of the modified nucleotide into the nucleic acid polymer. For example, the methods mentioned above for the synthesis of an oligonucleotide may be employed. In another approach a modified nucleotide can be produced by incorporating a modified nucleoside triphosphate into the polymer chain during an amplification reaction. Examples of modified nucleotides, by way of illustration and not limitation, include dideoxynucleotides, derivatives or analogs that are biotinylated, amine modified, alkylated, fluorophore-labeled, and the like and also include phosphorothioate, phosphite, ring atom modified derivatives, and so forth.

Biomonomer—a single biological monomer unit, which can be linked with the same or other biomonomers to form a biopolymer. For example, a single amino acid or nucleotide with two linking groups, one or both of which may have removable protecting groups, is a biomonomer. A biomonomer fluid or solution or biopolymer fluid or solution refers to a liquid containing either a biomonomer or biopolymer, respectively, typically in a solution comprising an ancillary material.

Biopolymer—a polymer found in biological systems comprising a plurality of biological monomeric units or biomonomers linked together, such as nucleic acids (including DNA, RNA, polynucleotides, oligonucleotides, oligonucleotide probes) sugars, proteins, antibodies, antigens, enzymes, coenzymes, ligands, receptors, hormones and labels, and genes that specify any of the above. Biopolymers include compounds composed of or containing amino acid or nucleotide analogs or non-nucleotide groups.

This includes polynucleotides in which the conventional backbone has been replaced with a non-naturally occurring or synthetic backbone, and nucleic acids in which one or more of the conventional bases has been replaced with a synthetic base capable of participating in Watson-Crick type hydrogen bonding interactions.

Substrate or Surface—a porous or non-porous water insoluble material. The surface can have any one of a number of shapes, such as strip, plate, disk, rod, particle, including bead, and the like. The substrate can be hydrophilic or capable of being rendered hydrophilic and includes inorganic powders such as silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly (4-methylbutene), polystyrene, polymethacrylate, poly (ethylene terephthalate), nylon, poly(vinyl butyrate), etc.; either used by themselves or in conjunction with other materials; glass available as Bioglass, ceramics, metals, and the like. Natural or synthetic assemblies such as liposomes, phospholipid vesicles, and cells can also be employed.

Immobilization of oligonucleotides on a substrate or surface may be accomplished by well-known techniques, commonly available in the literature. See, for example, A. C. Pease, et al., *Proc. Nat. Acad. Sci. USA*, 91:5022–5026 (1994).

Ancillary Materials—materials that are conventionally employed in the fabrication of biopolymer arrays. For example, ancillary materials include, but are not limited to buffers, salts, reagents, and solvents. For example, ancillary materials include activation, deactivation, deprotection, oxidizing, reducing and capping agents or reagents and anhydrous solvents used in biopolymer synthesis or in pre-synthesized biopolymer attachment to an array.

The term "alkyl" refers to a monoradical branched or unbranched saturated hydrocarbon chain preferably having from 1 to 40 carbon atoms, more preferably 1 to 10 carbon atoms, and even more preferably 1 to 6 carbon atoms. This term is exemplified by groups such as methyl, ethyl, n-propyl, iso-propyl, n-butyl, iso-butyl, n-hexyl, n-decyl, tetradecyl, and the like, unless otherwise indicated.

The term "alcohol" refers to an alkyl containing one or more hydroxyl groups.

The term "alkyl alcohol" refers to a substituted alkyl having an alcohol group or a substituted alcohol having an alkyl group.

The term "halogen" refers to fluoro, chloro, bromo and iodo groups.

The term "haloalkylalcohol" or "halogenalkylalcohol" refers to an alkyl alcohol as defined above substituted by 1 to 4 halo groups as defined above, which may be the same or different, such as trifluoromethyl-, trichloroethyl-alcohol, and the like.

It will also be appreciated that throughout the present application, words such as "upper", "lower" and the like are used with reference to a particular orientation of the apparatus with respect to gravity, but it will be understood that other operating orientations of the apparatus or any of its components, with respect to gravity, are possible. Reference to a "droplet" being dispensed from a pulsejet herein, merely refers to a discrete small quantity of fluid (usually less than about 1000 pL) being dispensed upon a single pulse of the pulsejet (corresponding to a single activation of an ejector) and does not require any particular shape of this discrete quantity. When a "spot" is referred to, this may reference a dried spot on the substrate resulting from drying of a dispensed droplet, or a wet spot on the substrate resulting from a dispensed droplet which has not yet dried, depending upon the context. "Fluid" is used herein to reference a liquid. Use of the singular in reference to an item, includes the possibility that there may be multiple numbers of that item.

DETAILED DESCRIPTION OF THE INVENTION

A block diagram of the method 100 of fabricating an array of biopolymers on a substrate is illustrated in FIG. 1. The method 100 is useful for shielding the reactions and reactants in biopolymer synthesis, such as the growing biopolymer chain or a biomonomer to be added to the growing chain. In particular, the invention is useful for shielding reactions or reactants that are or become sensitive to a component of the ambient environment during the synthesis process. For example, the method is useful for shielding a biomonomer that, upon activation for attachment to the biopolymer, becomes susceptible to reaction with moisture in the air, or shielding a pre-synthesized biopolymer that, upon deprotection for attachment to an array substrate, becomes susceptible to evaporation.

The method 100 of fabricating an array of biopolymers from biomonomers follows the conventional in situ synthesis chemistry for the synthesis of each type of biopolymer, such as oligonucleotides, proteins, etc. An array substrate is prepared so that a biomonomer can be linked to its surface using conventional methods. The biomonomer is deposited onto the surface of the substrate and is suitably linked thereto in an array pattern of features. According to conventional synthesis steps, the substrate-bound biomonomer is then chemically prepared to receive or link to another biomonomer. Different or the same biomonomers are subsequently added to the locations on the array features in an iterative process to synthesize the same or different biopolymers. The number of biopolymers and their sequence make-up, depends on the particular assay to be performed using the array.

The biomonomer may be in solution comprising a solvent or other ancillary materials for deposition. For example, in the synthesis of oligonucleotides, typically the phosphoramidite is dissolved in an anhydrous solvent for deposition. Conventional anhydrous solvents that are used in phosphoramidite deposition are acetonitrile, propylene carbonate, adiponitrile, etc. The biomonomers that are subsequently added are chemically prepared, or may be activated, to link to the array bound biomonomer. In the synthesis of oligonucleotides, a phosphoramidite is activated by reaction with a reagent, such as tetrazole, ethylthiotetrazole, dicyanoimidazole, or benzimidazolium triflate, for example. Phosphoramidites and nucleoside phosphoramidites are well known in the art and described in, for example, U.S. Pat. No. 5,902,878, U.S. Pat. No. 5,700,919, U.S. Pat. No. 4,415,732, PCT publication WO 98/41531 and the references cited therein, among others, all of which are incorporated herein by reference. Therefore, the subsequent biomonomer solution may also contain an activation reagent or activator. Other conventional ancillary materials may be present also.

A long-standing problem in in situ biopolymer array synthesis is the effect of environmental conditions on the synthesis process. For example, if one of the reagents or biomonomers is susceptible to reaction with components of the environment, for example, moisture in the ambient, the moisture will react immediately with the reagent or biomonomer until total hydrolysis thereof. Therefore, biopolymer synthesis is performed typically in a nitrogen chamber that is essentially devoid of moisture. However, biopolymer synthesis involves working with very small quantities in solution, such as droplets of a few pico- or nano-liters of product in solution. The surface-to-volume ratio of these droplets is very high and susceptible to even very small quantities of moisture. The high surface-to-volume ratio essentially favors the impact of diffusion of moisture into the droplets. Typical nitrogen chambers do not adequately prevent such small quantities of moisture, for example, from interfering with biopolymer synthesis. Therefore, without additional precautions, the droplets of reactive solution will react with components in the ambient environment, even in a nitrogen chamber, and will be depleted before all of activated biomonomer is allowed to react and become a part of the biopolymer.

In accordance with the invention, the method 100 comprises applying 101 a non-miscible fluid (NMF) to the array surface where the biopolymers are being synthesized. The NMF completely covers the synthesis area(s) and provides an environmental shield for the synthesis reactants and reactions. According to the invention, the NMF is inert and insoluble with respect to the biomonomers, biopolymers, reagents and other ancillary materials used in the synthesis of the biopolymers. For oligonucleotide synthesis, the NMF is inert and insoluble with respect to the phosphoramidite biomonomer, its activator reagent and the anhydrous solvent for example.

For the purposes of the invention, the term "non-miscible" has its conventional definition. The NMF does not mix with the biomonomer, reagents, anhydrous solvents and other ancillary materials used in the synthesis processes. The term "inert" has its conventional definition. The NMF does not chemically react with the biomonomer, reagents, anhydrous solvent or other ancillary materials. Moreover, the term "insoluble" has its conventional definition. The solubility of the NMF in the solution of biomonomer and activator reagent in the anhydrous solvent is less than about 10 mg per milliliter. In addition, the NMF should have a low affinity for the environmental component(s) in the ambient atmosphere that the NMF is intended to shield against. For example, the NMF should have a low affinity for water, such that moisture vapor does not penetrate the NMF to reach a biomonomer that is sensitive to moisture. The solubility of water in the NMF is below 0.2 g of water per kilogram of NMF at 20° C., and preferably below 0.13 g of water per kilogram of NMF at 20° C., and depends on the particular NMF.

Some NMF that are particularly useful for the invention are listed in Table 1. The list in Table 1 is illustrative only. As long as the NMF has the characteristics described above, it is within the scope of the invention. In the case of oligonucleotide synthesis, preferably heptane provides the characteristics necessary for shielding phosphoramidite synthesis conditions and materials, from the ambient, but any other fluid with similar properties to heptane could be used. However, because of the melting temperature of heptadecane, the temperature must be kept above 20° C. when heptadecane is used as the NMF.

The method 100 of the invention further comprises the step of depositing 103 the biomonomer solution, which is suitable activated for attachment to the surface of the array, or to a surface-bound biomonomer on the array, with conventional deposition equipment, such as computer controlled inkjet systems or piezoelectric deposition systems that are well known in the art.

The deposition system used to deposit biomonomers in solution on the array has a head with multiple pulsejets, each of which can dispense fluid droplets onto the substrate. Each such jet includes a chamber with an orifice, and an ejector which, when activated, causes a droplet to be ejected from the orifice. There is typically one pulsejet for each different biomonomer to be deposited. The ejected droplet has sufficient speed to penetrate the NMF and reach the surface of the array where the biopolymer is being synthesized.

Figure 2:
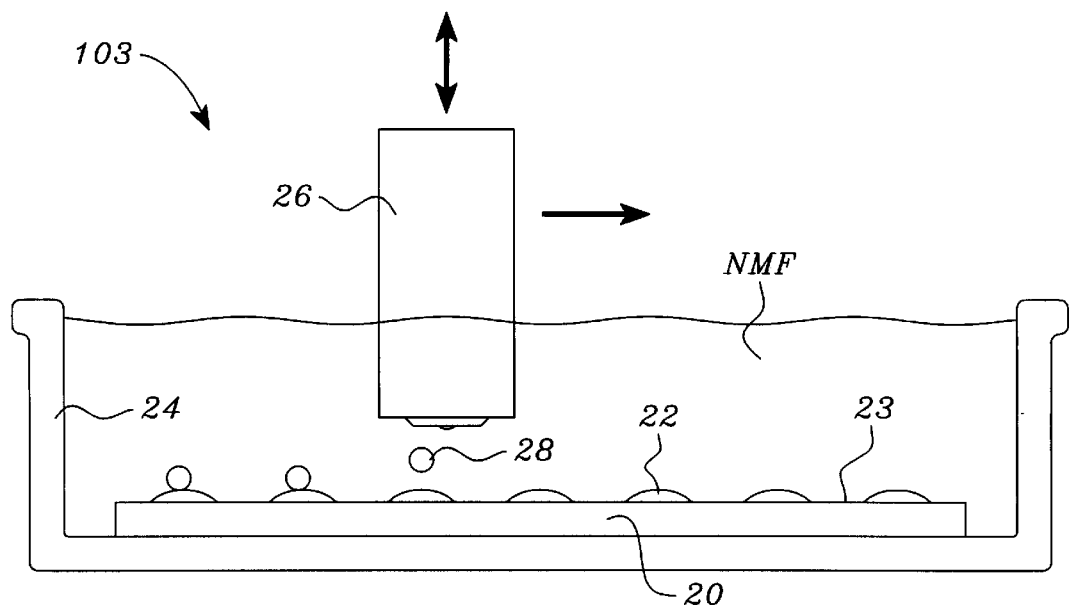
FIG. 2 a side view of an apparatus that is used in the method of the invention according to one embodiment.

According to one embodiment of the method 100, the step of depositing 103 comprises the step of immersing the pulsejets into the NMF before the step of ejecting droplets of the biomonomer solution. FIG. 2 illustrates this embodiment, however only one pulsejet is illustrated for simplicity. The array substrate 20 comprises an array of biopolymer synthesis sites 22 on the surface 23 thereof. The array 20 is placed in the bottom (surface 23 side up) of a vessel 24 that is constructed to hold fluids.

TABLE 1

Representative Non-miscible Fluids

| Non-miscible Fluids (NMF) | melting temperature (° C.) | boiling point (° C.) | Density (g/ml) | viscosity (cP at 20° C.) | solubility with acetonitrile at 20° C. |
|---|---|---|---|---|---|
| heptane |  | 98–99 | 0.683 | 0.409 | immiscible |
| octane |  | 125–126 | 0.702 | 0.542 | immiscible |
| nonane |  | 150–151 | 0.718 | 0.711 | immiscible |
| decane |  | 173–174 | 0.73 | 0.92 | immiscible |
| undecane |  | 195–196 | 0.742 | 1.17 | immiscible |
| dodecane |  | 241–216 | 0.748 | 1.35 | immiscible |
| tridecane | −5.50 | 235–236 | 0.755 | 1.55 | immiscible |
| tetradecane | 5.0–7.0 | 250–253 | 0.762 | 2.18 | immiscible |
| pentadecane | 8.0–10.0 | 269–270 | 0.769 | 2.81 | immiscible |
| hexadecane | 17.0–19.0 | 283–286 | 0.773 | 3.34 | immiscible |
| heptadecane | 20.0–22.0 | 303 | 0.778 |  | immiscible |
| cycloheptane |  | 116–118 | 0.812 | 1.64(13.5C) | immiscible |
| cyclooctane |  | 150–152 | 0.836 | 2.35(13.5C) | immiscible |
| cyclononane |  |  |  |  | immiscible |
| cyclodecane | 9.0–10.0 | 201 | 0.858 |  | immiscible |

The vessel 24 holds a sufficient quantity of NMF to completely cover the array substrate 20 and allow a portion of the pulsejet 26 to be immersed therein. In this embodiment, the NMF is applied (step 101) by flooding the NMF over the surface 23 of the array 20 within the vessel 24. The NMF is immiscible with the biopolymer synthesis components and ancillary materials on the surface 23 of the array 20. Moreover, preferably the NMF has a different density and a different viscosity than ancillary materials used for the biopolymer synthesis, such as the solvents. More preferably, the density of the NMF is lower in this embodiment so that the biomonomers in solution 28 remain adjacent to the array surface 23 and the NMF surrounds and covers the biomonomer solution at the synthesis sites 22. The pulsejet 26 is immersed into the NMF over the biosynthesis sites 22 and ejects the biomonomer solution 28 to the site 22. The biomonomer solution 28 is shielded by the NMF from the environment. The biomonomer solution 28 is suitably activated and links at a respective synthesis site 22 of a growing biopolymer chain under the NMF shield. The pulsejet 26 is withdrawn from the NMF (illustrated by the double-headed arrow in FIG. 2), and moved to another synthesis site 22 (which is illustrated by the single headed arrow), where it is reimmersed to eject the next biomonomer solution 28 to the next site 22.

As mentioned above, there is one pulsejet 26 for each different type of biomonomer being deposited. For oligonucleotide synthesis, there are four pulsejets, for example, one for each nucleotide base. In practice, all pulsejets 26 may be immersed into the NMF in the step of immersing. However, not all of the pulsejets 26 will actually fire and eject a biomonomer solution 28 at each step of ejecting. Whether and which pulsejet 26 actually fires a biomonomer solution 28 depends on the desired sequence of biomonomers at each synthesis site 22 of the array 20 and is controlled by a computer.

Figure 3:
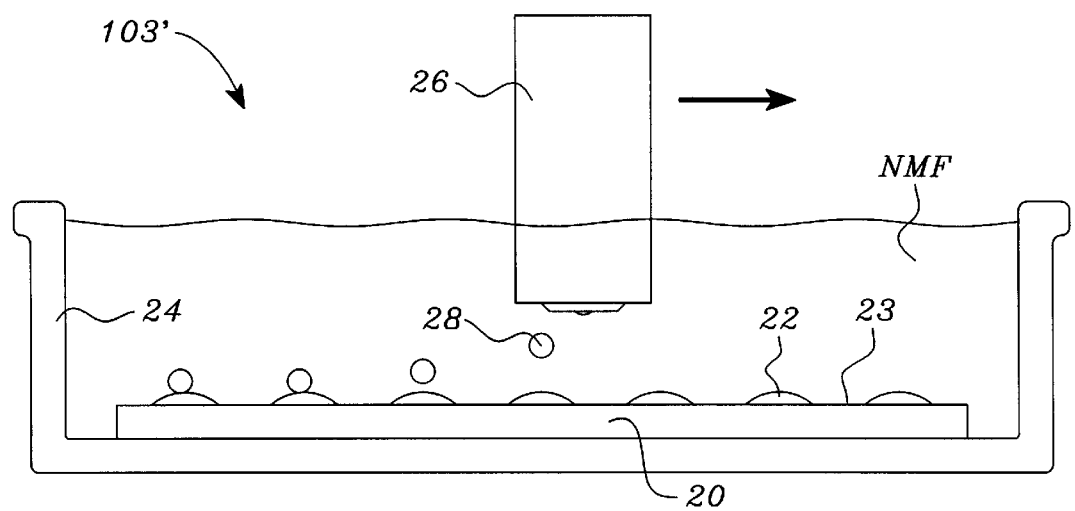
FIG. 3 illustrates a side view of an apparatus that is used in the method of the invention according to another embodiment.

FIG. 3 illustrates another embodiment of the method 100, wherein the step of depositing 103' comprises the step of immersing the pulse jet(s) 26 into the NMF above the surface 23 of the array 20 and ejecting a biomonomer solution droplet 28 to the synthesis sites 22. However, after the step of ejecting, the pulsejets are not withdrawn from the NMF before moving to the next synthesis site 22, as was described above for FIG. 2. Instead, the pulsejet 26 is just moved through the NMF above the surface 23 of the array 20 to the next site 22 location. The ejected biomonomer droplets 28 reach the surface 23 where they will couple or link at respective synthesis sites 22 on the array 20.

Figure 4:
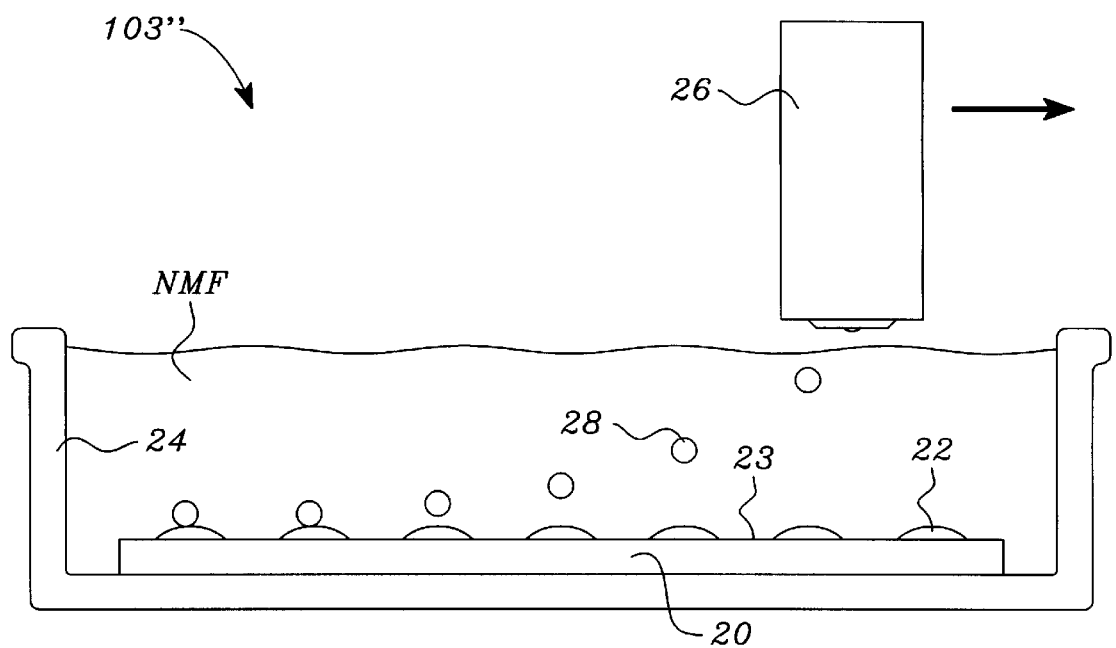
FIG. 4 illustrates a side view of an apparatus that is used in the method of the invention according to still another embodiment.

FIG. 4 illustrates still another embodiment of the method 100, wherein the step of depositing 103" comprises the step of ejecting the activated biomonomer droplets 28 into the NMF, without first immersing the pulsejets 26 into the NMF, to deposit the biomonomer droplets 28 on the synthesis sites 22. In this embodiment, the step of depositing 103" also comprises the step moving the pulse jets 26 above the level of the NMF. Since the pulse jets 26 are not immersed in the NMF, the pulsejets 26 are not withdrawn from the NMF before they are moved. When the biomonomer droplets 28 reach the surface 23 of the array 20, they will couple or link at respective synthesis sites 22 on the array 20.

Figure 5:
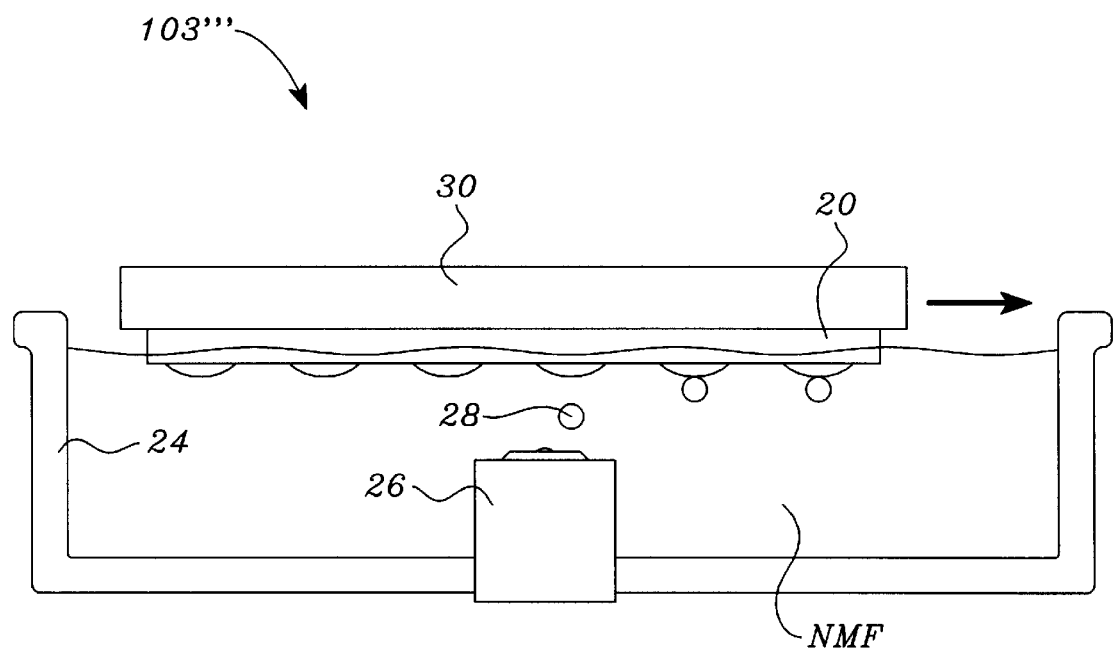
FIG. 5 illustrates a side view of an apparatus that is used in the method of the invention according to yet another embodiment.

FIG. 5 illustrates still another embodiment, wherein the orientation of the array 20 and the pulsejet 26 is reversed. The array 20 is attached to a moving arm 30 above the vessel 24' that is accommodated to hold the pulsejet 26 in the bottom portion thereof. The array 20 surface 23 is flooded with NMF in that the whole surface 23 of the array 20 is immersed in a quantity of NMF in the vessel 24'. In the step of depositing 103''', the array 20 is immersed in the NMF. The arm 30 moves the array 20 as the activated biomonomer droplets 28 are ejected from the stationary pulse jets 26 through the NMF to respective synthesis sites 22, where the biomonomers will couple or link to grow the biopolymer chain.

Figure 6A:
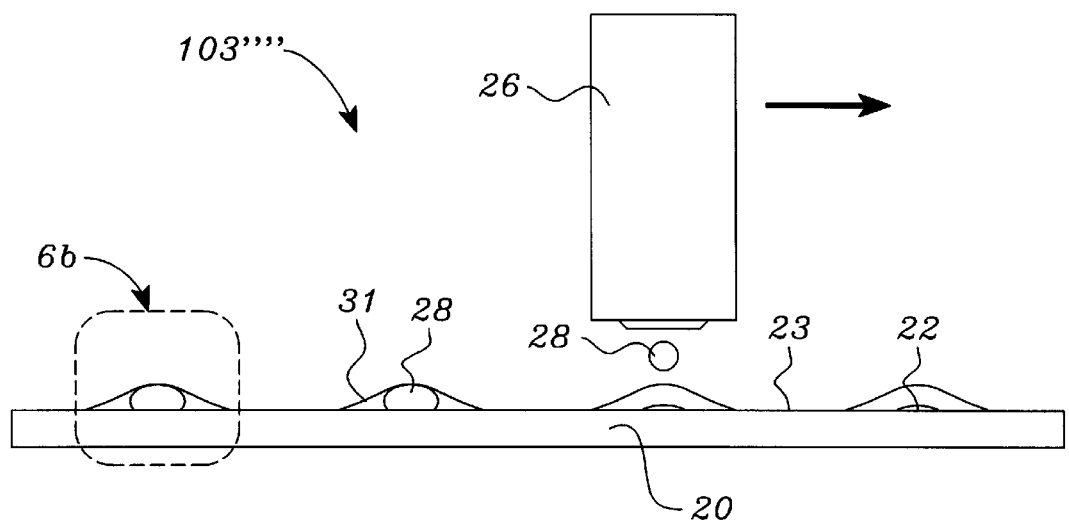
FIG. 6a illustrates a side view of an apparatus used in the method of the invention according to yet still another embodiment.
Figure 6B:
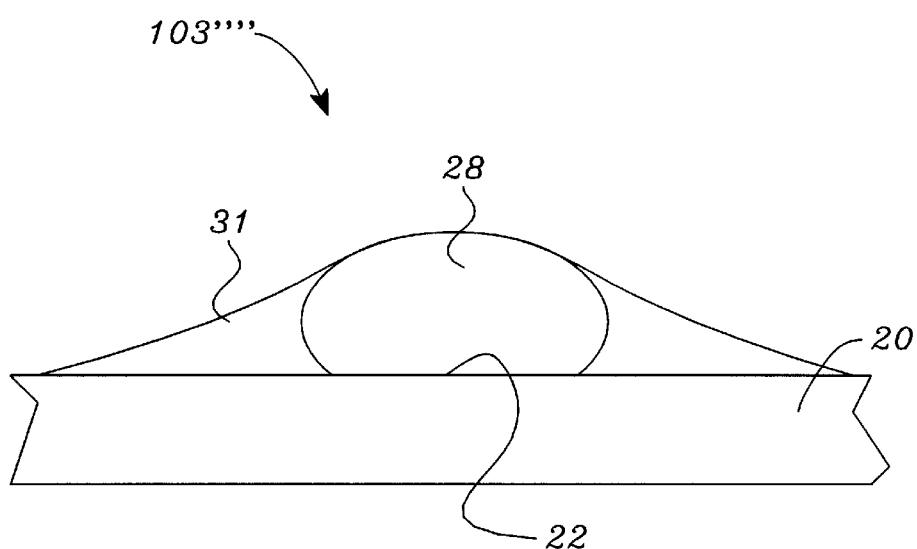
Figure 7:
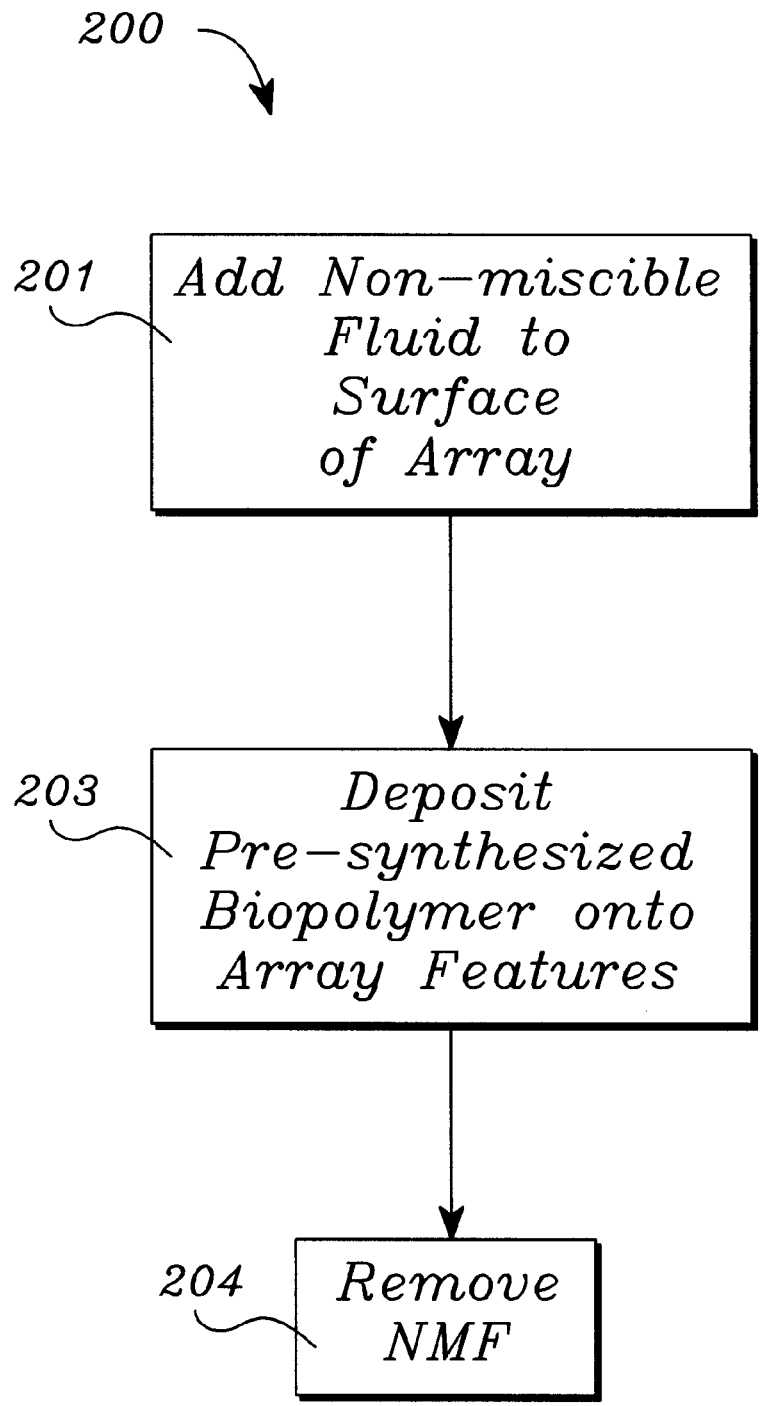
FIG. 7 illustrates a block diagram of another embodiment of the method of fabricating biopolymer arrays in accordance with the invention.

FIGS. 6a and 6b illustrate yet still another embodiment of the method 100, wherein the NMF is added (step 101) to the surface 23 of the array 20 by depositing individual droplets 31 of NMF that surround or envelop one or more individual biopolymer synthesis sites 22. In this embodiment, the step of depositing 103"" comprises the step of ejecting the biomonomer solution 28 from the pulse jet 26 into the droplet 31 of NMF. The droplet of biomonomer 28 moves into the NMF droplet 31 to the surface 23 where the synthesis reaction site 22. FIG. 6b is a magnified view of the NMF droplet 31 surrounding the biomonomer droplet 28 that was ejected from pulsejet 26 of FIG. 6a. In this embodiment, the NMF droplet 31 may or may not fully cover or envelop the biomonomer solution droplet 28 in order to provide its shielding effects in accordance with the invention.

In each of the above embodiments, preferably the density of the NMF is different from the density of the biopolymer, biomonomer and ancillary materials. More preferably, the density of the NMF in each of the embodiments illustrated in FIG. 2–4, 6a and 6b is lower than the density of the biopolymer, biomonomer and ancillary materials so that the NMF better covers or shields the synthesis site 22 while the biosynthesis reactions occur on the surface 23. In the embodiment of the method 100' illustrated in FIG. 5, the density of the NMF is more preferably higher than that of the biopolymers, biomonomers and ancillary materials to better facilitate the movement and placement of biomonomer solution 28 at the synthesis sites 22. For oligonucleotide synthesis, the NMF has a density higher than acetonitrile, for example. The density of acetonitrile is 0.786 g/ml. Referring to Table 1, a NMF such as cyclooctane with a density of 0.836 gram/milliliter would be appropriate to facilitate the movement of the phosphoramidite and activator in anhydrous acetonitrile solvent droplets 28 to the array surface 23 in this embodiment.

As noted above, in each of the embodiments described above, the density of the activated biomonomer solution 28 is different from the NMF by being either higher or lower than the NMF, so that the biomonomer solution 28 effectively travels through the NMF to the synthesis sites 22 on the array surface 23 where the droplet remains for the synthesis to take place. In addition to differences in density, the surface tension of the different fluids facilitates the movement of the biomonomer droplets 28, as well as the deposition system. The inkjet and piezoelectric deposition systems can fire the droplets 28 at a high speed through the NMF shield to reach the surface 23 of the array 20 without difficulty. For example, for oligonucleotide synthesis, the firing speed of the pulsejet 26 is about 10 m/s. Therefore, the affect of having an NMF with a different density from the biomonomer droplets 28 is primarily to allow the NMF to surround and shield the activated biomonomers at the synthesis sites 22. The anhydrous NMF separates the synthesis sites 22 and all of the reactants from the atmosphere and shields them temporary from detrimental environmental conditions, such as moisture. The NMF delays the hydrolysis of reagents with moisture and allows the coupling reaction between biomonomers to be completed before moisture reaches the synthesis sites 22.

Referring back to FIG. 1, the method 100, 100' preferably further comprises the step of deactivating or quenching 105 any unreacted biomonomer or activation reagent after the coupling reaction is completed. A solution of a reagent that stops the action of the activation reagents is added to the array via either another pulse jet 26, such that the quenching reagent is fired through the NMF to the synthesis sites 22, or by flooding the surface of the array 20 with the quenching reagent. Quenching or deactivation reagents are well known in the art. If the quenching reagent is flooded over the surface of the array 20, then the quenching reagent preferably has a density that is different from the density of the NMF to displace the NMF or reach the unreacted biomonomer or activation reagent at biopolymer synthesis sites 22. For example, some alcohols and water each have densities that are higher than the NMF. An appropriate alcohol or mixture of an appropriate alcohol and water may be used for deactivation by flooding the surface of the array 20. Preferably, the deactivation reagent deactivates the activation reagents by hydrolysis. For oligonucleotide synthesis, the deactivation reagent may be methanol, water, alkyl alcohol, halogenalkylalcohol, or trichloroethanol, for example, to hydrolyze the reactants. Moreover, the deactivation reagent solution may have a higher density than the NMF to facilitate the reagent reaching the unreacted activation reagent at biopolymer synthesis sites when fired as droplets through the NMF shield in the embodiments illustrated in FIGS. 2–4, 6a and 6b, and may have a lower density than the NMF to facilitate the reagent reaching the unreacted reagents, etc., when fired as droplets through the NMF in the embodiment of FIG. 5. Alternatively, in the embodiment of FIG. 5, the arm 30 which holds and moves the array 20 could be withdrawn from the NMF in the vessel 24' during the deactivation step, such that the surface 23 of the array and the synthesis sites 22 are exposed to the moisture in the atmosphere for deactivation by hydrolysis. In this example, a deactivation reagent is not needed.

Upon deactivation, the method 100 preferably further comprises the step of removing 107 all the reagents and solutions from the array surface 23 so that the growing biopolymer chains can undergo further synthesis chemistry. Typically, one or more of the foregoing steps are repeated (step 109) in an iterative fashion, with a subsequent biomonomer 28 being deposited and linked to a previously deposited and linked biomonomer on the substrate 20. The growing biopolymer chain acts as a substrate bound moiety for each cycle, until all of the biomonomers have been added to the biopolymer array. In the fabrication of a typical array with multiple features, all of the foregoing steps are repeated at each of multiple different regions 22 on the same substrate 20, where it is desired to form the biopolymer features.

The biopolymers that may be synthesized according to the invention include DNA, RNA, proteins, etc. Where the array is a polynucleotide or oligonucleotide array, the biomonomers are nucleoside monomeric units. Likewise, where the array is a protein array, the biomonomers are amino acids. Protein arrays can be arrays of antibodies, antigens, ligands and receptors also, for example. Proteins are synthesized according to conventional methods, such as those described in U.S. Pat. Nos. 4,591,570; 5,143,854; and 5,252,743 and the following articles: Ekins, R., et al., "Development of microspot multi-analyte ratiometric immunoassay using dual fluorescent-labeled antibodies" *Analytica Chimica Acta*, (1989), 227:73–96; and Ekins, R P and F W Chu. "Multianalyte microspot immunoassay—microanalytical 'compact disc' of the future" (1991), all of which are incorporated by reference.

In the case of oligonucleotide arrays, conventional in situ synthesis chemistry is used. The phosphoramidite monomer unit is activated typically with tetrazole, for example, before the coupling reaction. The activated phosphoramidite is moisture sensitive and will react immediately with moisture in the ambient to hydrolyze the phosphoramidite. Without the method 100, 100' of the invention, the activated phosphoramidite will react with water vapor in ambient atmosphere, even in small amounts present in a nitrogen chamber, and be depleted before a sufficient amount of the activated phosphoramidite has reacted with the growing oligonucleotide chains of the array.

In still another embodiment, a method 200 is provided for fabricating arrays of biopolymers, wherein the biopolymers are pre-synthesized and then linked to the surface 23 of an array 20 in a desired array pattern of features. Such arrays 20 of pre-synthesized biopolymers include, for example cDNA arrays, DNA arrays or RNA arrays. In accordance with the method 200, the surface 23 of the array substrate 20 is prepared to receive or link to the pre-synthesized biopolymer using conventional well-known methods. For example, when the biopolymer is cDNA, the array substrate surface 23 is coated with an aqueous solution of polylysine. Moreover, the protecting group on the pre-synthesized biopolymer is removed (deprotection) using conventional methods, so that the biopolymer can link to the prepared surface 23. The deprotection step renders the pre-synthesized biopolymer water-soluble. Therefore, the deprotected pre-synthesized biopolymer is dissolved in aqueous solution for deposition onto the array 20. For example, when the pre-synthesized biopolymer is DNA or RNA, the deprotected pre-synthesized DNA or RNA is water-soluble and is typically dissolved in an aqueous buffer solution for deposition. However, the aqueous solution of pre-synthesized biopolymer is susceptible to evaporation, especially in small quantities, for example, when it is deposited onto the surface of the array for linking. Unless some precaution is taken, the aqueous solution may prematurely evaporate before the linking reaction occurs, or before the linking reaction is completed. As a result, some of the pre-synthesized biopolymer will not link to the surface 23. Therefore, the evaporation of the aqueous solution on the surface will vary the concentration, and resulting uniformity, of deposited pre-synthesized biopolymers at the respective feature locations 22.

In accordance with the method 200, the feature locations or sites 22 of the array 20 are then covered with the NMF (step 201). The NMF may be flooded over the surface 23, as in FIGS. 2–4, or deposited as droplets 31 over one or more individual sites 22, as in FIG. 6a. Alternatively, the array may be immersed into the NMF, as in FIG. 5.

Droplets of the aqueous solution of deprotected pre-synthesized biopolymer 28' are deposited (step 203) on the array 20, for example, by the pulsejet 26, as mentioned above for method 100, 100', or with a pin or capillary, as is well known in the art. In the preferred embodiment, the pulsejet heads 26 deliver the different biopolymers 28' to their desired feature locations 22 on the array 20. As described above for method 100, 100', the pulsejet 26 fires the droplets of biopolymer 28' into the NMF to the sites 22 or feature locations on the surface 23 of the array 20, where the particular biopolymer 28' sequence is to be linked. Any of the deposition methods illustrated in FIGS. 2 to 6a,b will work for the method 200. One pulsejet head 26 can deliver only one sequence of pre-synthesized biopolymer 28'. After a particular pre-synthesized biopolymer 28' sequence is delivered to all desired locations 22, the pulsejet head 26 is washed and reloaded with a solution of a different pre-synthesized biopolymer 28' sequence.

In accordance with the invention, the NMF that is applied to the array 20 is insoluble in aqueous solutions, such as in water and in buffer solution, such as the buffer solution used for the deprotected pre-synthesized DNA or RNA. The NMF effectively shields each droplet 28' and impedes or delays the diffusion and subsequent evaporation of the aqueous solution, so that the linkage reaction can be completed. As a result, the deposited pre-synthesized biopolymers 28' have uniform concentration throughout each feature location 22.

The NMF is then removed (step 204) from the array 20 and the array 20 is washed with water to remove any unbound biopolymers and ancillary materials, preferably about 5 to 10 minutes after all of the pre-synthesized biopolymers have been deposited. If the array surface 23 was treated with polylysine to prepare the surface for linkage, an additional step of capping unreacted polylysine surface sites 22 must be performed according to conventional methods to prevent further binding to biopolymers, such as target sequences during an assay, which could compromise assay results. Whether an additional step to cap or deactivate is needed generally depends on the biopolymers that are being linked and the type of linkage chemistry chosen. The additional steps that may be necessary are well known in the art.

The methods 100 and 200 of the invention provide a robust tool for solving a longstanding problem in the art of making biopolymer arrays with accuracy. The biopolymer arrays are used in assays of target biological materials. In order for an assay to yield accurate results, it is important that the different biopolymer features actually be present on the array, that they are put down accurately in the desired or predetermined pattern and biomonomer sequence, that the biopolymers are of the correct size, and that each different feature be uniformly populated with the respective biopolymer. The present method 100, 200 provides means to protect the sensitive reaction environment during biopolymer array fabrication from external environmental influences that might compromise the fabrication of the desired biopolymer array. Moreover, the present invention provides a means by which the potential reactivity of an activated biomonomer or of a deprotected pre-synthesized biopolymer with an ambient atmosphere component can be kept low. As a result, the biopolymer array fabricated in accordance with the invention will more likely have uniformly populated biopolymers of the correct sequence and size at each array feature.

While biopolymer arrays are described above, the present invention contemplates that these particular moieties can readily be replaced with other moieties (such as other chemical or biochemical moieties, for example various small molecules), where the activated component is more reactive with a component of the ambient atmosphere than is the unactivated component. Thus, wherever a reference is made to biopolymers, this can be replaced with a reference to any such moieties.

The present invention is essentially a method of shielding sensitive biosynthesis reactions and reactants from one or more components of the ambient environment. The NMF is essentially a shield that is applied over the biosynthesis reactions to separate the bioreactants from the ambient environment while the biosynthesis reactions take place.

Thus there has been described a new method 100, 100', 200 of fabricating biopolymer arrays that provide a shield for sensitive biopolymer fabrication on the array from environmental conditions which may have detrimental effects on the accuracy of the fabrication results. It should be understood that the above-described embodiments are merely illustrative of the some of the many specific embodiments that represent the principles of the present invention. Clearly, numerous other arrangements can be readily devised by those skilled in the art without departing from the scope of the present invention.

What is claimed is:
1. A method of fabricating a biopolymer array from biomonomers comprising the steps of:
   (a) depositing a biomonomer in solution onto a substrate for linking the biomonomer to a surface of the substrate in an array pattern of features;
   (b) deprotecting the linked biomonomer, such that the linked biomonomer can react with subsequent biomonomers in solution;
   (c) depositing a subsequent biomonomer in solution onto the features, the subsequent biomonomer being activated for attachment to the linked biomonomer on the array feature by an activation reagent, the subsequent biomonomer becoming the linked biomonomer upon attachment;
   (d) applying a non-miscible fluid (NMF) over the features on the surface of the substrate before or after any of the above steps (a) to (c), the NMF being inert and insoluble with the biomonomer solution, the activation reagent, the activated biomonomer and the linked biomonomer; and
   (e) repeating at least step (c) until the biopolymer is synthesized at each feature.

2. The method of claim 1, wherein the biopolymer array comprises multiple different array features and steps (a) through (d) are repeated at each of multiple different features on the same substrate, to produce the array of multiple different biopolymers.

3. The method of claim 1, wherein the step of applying (d) the NMF comprises the step of depositing an amount of NMF so as to cover an area greater than the area of each feature.

4. The method of claim 3, wherein the step of depositing an amount of NMF comprises the step of depositing a droplet of NMF on each feature that is large enough to completely cover the feature, and wherein the steps (a) and (c) of depositing the biomonomers comprise the steps of:
   loading the biomonomer in solution into a pulsejet of a deposition system;
   positioning the pulsejet over the NMF droplet on the surface of the array;
   ejecting the biomonomer from the pulsejet into the NMF droplet and to the feature;
   moving the pulse jet to a next feature; and
   repeating the steps of positioning, ejecting and moving for each applicable feature location until the biomonomer is deposited on all applicable features.

5. The method of claim 3, wherein the step of depositing an amount of NMF comprises the step of covering the entire array surface and completely covering the features with the NMF.

6. The method of claim 5, wherein the steps (a) and (c) of depositing the biomonomers comprise the steps of:
   loading the biomonomer in solution into a pulsejet of a deposition system;
   immersing the pulsejet into the NMF over a feature on the surface of the array;
   ejecting the biomonomer from the pulsejet to the feature;
   moving the immersed pulse jet to a next applicable feature location and ejecting the biomonomer to the applicable feature; and repeating the step of moving and ejecting until the biomonomer is deposited on all applicable features.

7. The method of claim 5, wherein the steps (a) and (c) of depositing the biomonomers comprise the steps of:
   loading the biomonomer in solution into a pulsejet of a deposition system;
   immersing the pulsejet into the NMF over a feature on the surface of the array;
   ejecting the biomonomer from the pulsejet to the feature;
   removing the pulse jet from the NMF and moving the pulse jet to a next applicable feature location; and
   repeating the steps of immersing, ejecting and removing over each applicable synthesis site until the biomonomer is deposited on all applicable features.

8. The method of claim 5, wherein the steps (a) and (c) of depositing the biomonomers comprise the steps of:
   loading the biomonomer in solution into a pulsejet of a deposition system;
   positioning the pulsejet above the NMF over a feature location on the surface of the array;
   ejecting the biomonomer from the pulsejet and into the NMF to the feature;
   moving the pulse jet to a next applicable feature location; and
   repeating the steps of positioning, ejecting and moving over each applicable feature location until the biomonomer is deposited on all applicable features.

9. The method of claim 5, wherein the steps (a) and (c) of depositing the biomonomers comprise the steps of:
   loading the biomonomer in solution into a pulsejet of a deposition system;
   immersing the array surface into the NMF and aligning a feature on the array surface with the pulsejet;
   ejecting the biomonomer from the pulsejet to the feature;
   moving the array such that a next applicable feature location is aligned with the pulse jet; and
   repeating the steps of ejecting and moving for each applicable feature location until the biomonomer is deposited on all applicable features.

10. The method of claim 1, wherein the NMF has a density that is different from the density of the biomonomer solution.

11. The method of claim 10, wherein the NMF has a lower density than the density of the biomonomer solution.

12. The method of claim 10, wherein the NMF has a higher density than the density of the biomonomer solution.

13. The method of claim 1 further comprising the steps of:
   (d') deactivating unreacted activation reagent, the deactivation reagent having a density that is different from the NMF; and
   (d") removing the NMF, reagents, and unreacted biomonomer solution from the array surface before the step (e).

14. The method of claim 13, wherein the step of deactivating (d') comprises hydrolyzing the activation reagent and unreacted biomonomer.

15. The method of claim 13, wherein the biopolymer is selected from a group consisting of an oligonucleotide and polynucleotide; the biomonomers are selected from a group consisting of phosphoramidites, phosphites and H-phosphonates; the solution comprises a solvent selected from a group consisting of acetonitrile, propylene carbonate and adiponitrile; the activation reagent is selected from a group consisting of tetrazole, ethylthiotetrazole, dicyanoimidazole and benzimidazolium triflate; the deactivation reagent is selected from a group consisting of methanol, water, an alkyl alcohol, a halogenalkylalcohol, and trichloroethanol; and wherein the NMF is selected from a group consisting of heptane, octane, nonane, decane, undecane, dodecane, tridecane, tetradecane, pentadecane, hexadecane, heptadecane, cycloheptane, cyclooctane, cyclononane, and cyclodecane.

16. The method of claim 1, where the NMF is applied after the biomonomer is linked to the surface of the substrate, but before the subsequent biomonomer and activation reagent are deposited.

17. The method of claim 1, where the NMF is applied before the biomonomer is deposited and linked to the surface of the substrate.

18. In a method of fabricating a biopolymer array from biomonomers synthesized on the array by depositing and linking a biomonomer from a biomonomer solution to a feature location on a surface of the array, and depositing a subsequent biomonomer in solution onto the feature location that is suitably activated with an activation reagent to couple with the linked biomonomer, wherein the above steps are repeated to form a biopolymer sequence at multiple feature locations on the array, the improvement comprising the step of:
   applying a non-miscible fluid (NMF) over the feature locations on the surface of the array, the NMF being inert and insoluble with the biomonomer solution and activation reagent.

19. The method of claim 18, where the NMF is applied after the biomonomer is linked to the surface of the array, but before the subsequent biomonomer and activation reagent are deposited.

20. The method of claim 18, where the NMF is applied before the biomonomer is deposited and linked to the surface of the array.

21. The method of claim 18, wherein the step of applying a NMF comprises the step of depositing an amount of NMF so as to cover an area greater than the area of each feature location.

22. The method of claim 21, wherein the step of depositing an amount of NMF comprises the step of covering the entire array surface and feature locations with the NMF.

23. The method of claim 18, wherein the NMF has a density that is different from the density of the biomonomer solution.

24. The method of claim 23, wherein the NMF has a lower density than the density of the biomonomer solution.

25. The method of claim 23, wherein the NMF has a higher density than the density of the biomonomer solution.

26. The method of claim 18 further comprising the steps of:
   deactivating unreacted activation reagent with a deactivation reagent, the deactivation reagent having a density that is different from the NMF, the NMF being inert and insoluble in the deactivation reagent; and
   removing the NMF, reagents and unreacted biomonomer solution from the array surface before another biomonomer is deposited onto the array.

27. The method of claim 26, wherein the step of deactivating comprises hydrolyzing the activation reagent and unreacted biomonomer.

28. The method of claim 26, wherein the biopolymer is selected from a group consisting of an oligonucleotide and polynucleotide; the biomonomers are selected from a group consisting of phosphoramidites, phosphites and H-phosphonates; the solution comprises a solvent selected from a group consisting of acetonitrile, propylene carbonate and adiponitrile; the activation reagent is selected from a group consisting of tetrazole, ethylthiotetrazole, dicyanoimidazole and benzimidazolium triflate; the deactivation reagent is selected from a group consisting of methanol, water, an alkyl alcohol, a halogenalkylalcohol, and trichloroethanol; and wherein the NMF is selected from a group consisting of heptane, octane, nonane, decane, undecane, dodecane, tridecane, tetradecane, pentadecane, hexadecane, heptadecane, cycloheptane, cyclooctane, cyclononane, and cyclodecane.

* * * * *